JOSEPH P. BRADFORD.
Improvement in Combined Boilers and Steamers.
No. 119,961. Patented Oct. 17, 1871.
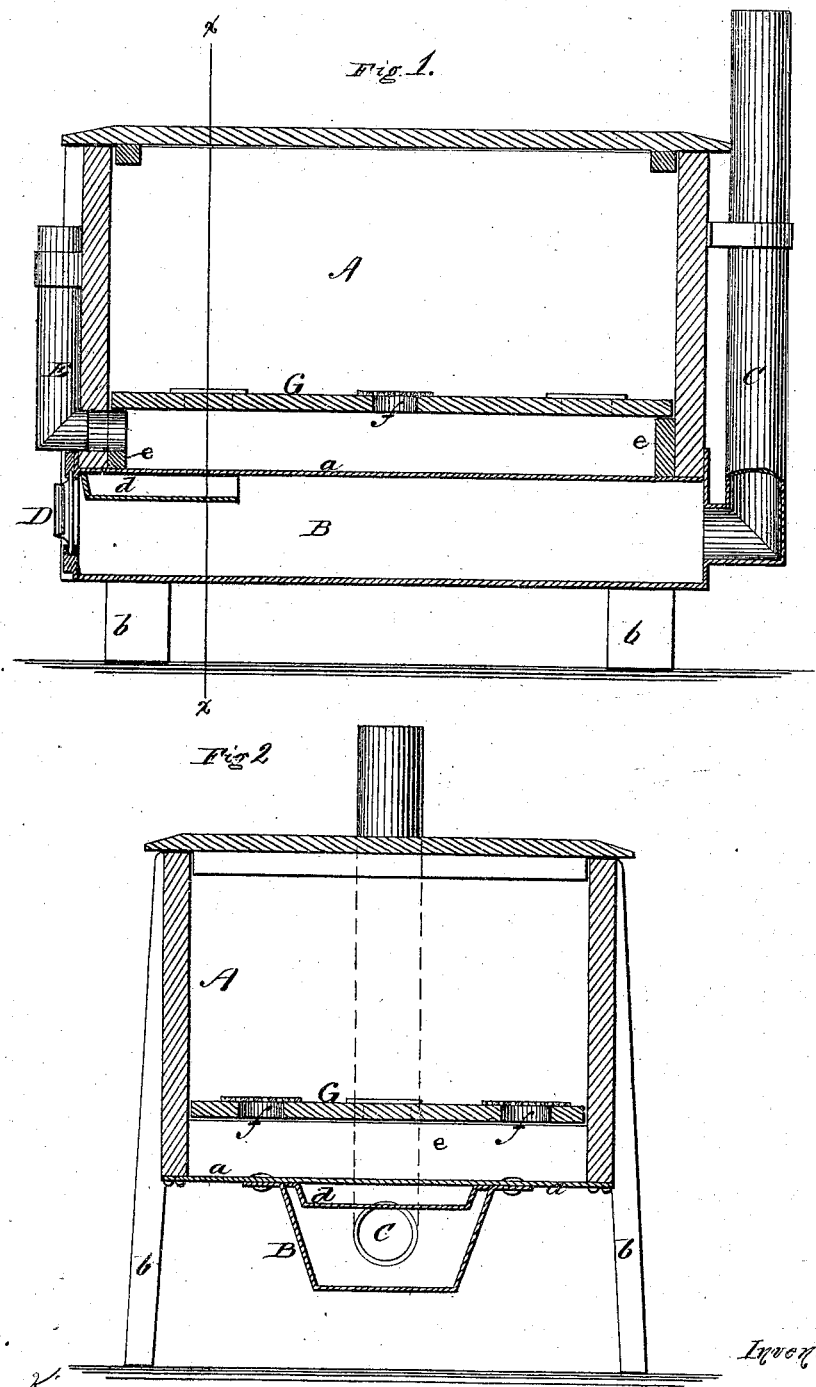

UNITED STATES PATENT OFFICE.

JOSEPH P. BRADFORD, OF CALAMUS, IOWA.

IMPROVEMENT IN COMBINED BOILER AND STEAMER.

Specification forming part of Letters Patent No. 119,961, dated October 17, 1871.

*To all whom it may concern:*

Be it known that I, JOSEPH P. BRADFORD, of Calamus, in the county of Clinton and State of Iowa, have invented certain Improvements in a Boiler and Steamer combined, of which the following is a specification, reference being had to the accompanying drawing.

My invention relates to a portable boiler and steamer for cooking food for stock and for similar purposes; and the invention consists in a novel manner of constructing the same with a wooden body and a metal bottom and furnace, and with a removable false bottom, all as hereinafter explained.

Figure 1 is a vertical longitudinal section through the center of my boiler, with the false bottom in place; and Fig. 2 is a vertical cross-section of the boiler on the line $x\ x$, Fig. 1.

In proceeding to construct my apparatus I first provide a rectangular wooden box or body, A, provided with a flat sheet-metal bottom, $a$, and mounted upon four legs, $b$, as shown. Lengthwise against the under side of the bottom $a$ I secure a sheet-metal fire-box or furnace, B, of a U-form in cross-section. The rear end of the fire-box I provide with a smoke-stack, C, and the front end with a door or slide, D, for regulating the draught of the fire. Against the bottom $a$, within the forward end of the fire-chamber, I secure a plate, $d$, to prevent the fire, which is hottest at that point, from burning through the bottom $a$. Against one side of the body A I secure a vertical tube, E, the lower end of which enters the body closely above the bottom $a$. Against the inside of the body, above the bottom, I place cleats $e$, and I then provide a false bottom, G, of the proper size to fit within the body and rest upon the cleats $e$ above the bottom $a$, as shown. Through the false bottom I make numerous holes or openings $f$, and cover the same with wire gauze or perforated metal. I also provide the body A with top or cover, by which it can be closed tightly.

When the apparatus is to be used for steaming food or vegetables the false bottom G is inserted, as shown, the articles to be steamed placed thereon, water poured in through the tube E so as to fill up half way or more to the false bottom, and then a fire started in the fire-box or chamber B. The bottom $a$ being quite thin, and being subjected to the direct action of the fire, steam is generated rapidly, and passes up through the holes $f$, filling the body and rapidly cooking the articles therein. A valve may be placed in the pipe E to prevent the escape of steam; or, better still, the end of the pipe may be small or flat, and be placed so low down that its mouth will always be below the water. When the apparatus is to be used merely for boiling articles the false bottom may be removed and the body may be filled as high as desired with water; or, if desired, the false bottom may be retained while using the apparatus as a boiler, the bottom G serving in such case to sustain the articles being cooked above the bottom $a$, so as to prevent them from being burnt or scorched thereon in case the fire is very hot.

Instead of making the bottom $a$ and the fire-chamber of sheet-metal and riveting them together, as shown, they may be cast together in one piece, which may be readily bolted to the body.

By the above-described method of construction I am enabled to produce an exceedingly cheap, simple, and efficient boiler and steamer, and one which is so light that it can be readily removed or transported from place to place. By arranging the feed or supply-pipe E at the front end of the body so as to discharge the cold water close to the bottom, over the hottest part of the fire, the water is rapidly heated, and the bottom $a$ also prevented from injury by the fire.

Having described my invention, what I claim is—

The herein-described apparatus, consisting of the box A, with the removable perforated bottom G, supply-pipe E, and furnace B, all constructed and arranged to operate substantially as described.

JOSEPH P. BRADFORD.

Witnesses:
W. L. CARROLL,
J. GOLDSBURY.

(59)